United States Patent [19]
Allen et al.

[11] Patent Number: 5,248,873
[45] Date of Patent: Sep. 28, 1993

[54] INTEGRATED DEVICE FOR RECOGNITION OF MOVING OBJECTS

[75] Inventors: Timothy P. Allen, Los Gatos; Federico Faggin, Los Altos Hills, both of Calif.

[73] Assignee: Synaptics, Incorporated, San Jose, Calif.

[21] Appl. No.: 939,108

[22] Filed: Sep. 1, 1992

Related U.S. Application Data

[63] Continuation of Ser. No. 713,360, Jun. 10, 1991, abandoned.

[51] Int. Cl.⁵ .................................................. H01V 40/14
[52] U.S. Cl. .................................. 250/208.1; 250/578.1
[58] Field of Search ............ 250/206.1, 206.2, 208.1, 250/561, 566; 382/68, 33, 36, 39

[56] References Cited

U.S. PATENT DOCUMENTS

| | | | |
|---|---|---|---|
| 3,522,585 | 8/1970 | Lemay | 340/146.3 |
| 3,600,556 | 8/1971 | Acker et al. | 250/566 |
| 4,597,014 | 1/1986 | Suzuki | 358/213 |
| 4,611,347 | 9/1986 | Netravali et al. | 382/27 |
| 4,825,291 | 4/1989 | Mimura et al. | 358/213.19 |
| 4,952,809 | 8/1990 | McEwen | 250/342 |

FOREIGN PATENT DOCUMENTS 2105943 7/1981 United Kingdom .

Primary Examiner—David C. Nelms
Attorney, Agent, or Firm—Kenneth D'Alessandro

[57] ABSTRACT

A moving object classifier is integrated onto a single integrated circuit chip and includes a retina comprising a two-dimensional array of photosensors upon which the image of the object of interest is focused. A position classifier receives inputs from the retina and determines where in the retina the image of an object is located. An object classifier receives inputs from the portion of interest of the retina and computes the degree of membership of the image to each class to be classified and determines which class has the largest membership function. A scan controller controlled by the position classifier limits the object classifier data to the portion of the retinal image which contains the object. An interface controller interfaces the other elements on the integrated circuit chip with a microcontroller, which comprises a standard CPU, memory and input/output lines interfacing to the interface controller.

27 Claims, 4 Drawing Sheets

INTEGRATED DEVICE FOR RECOGNITION OF MOVING OBJECTS

This application is a continuation of Ser. No. 713,360, filed Jun. 10, 1991, now abandoned.

BACKGROUND OF THE INVENTION

1. Field Of The Invention

The present invention relates to integrated circuit technology. More particularly, the present invention relates to object recognition and an integrated circuit system for recognition and identification of moving objects.

2. The Prior Art

Simple object recognition is a relatively easy task if the position of the object and its velocity are known. In this case, a registered, stationary image of the object can be obtained typically by using a linear array of photosensors. The captured image can then be fed to an object classifier circuit for analysis.

Image motion can be caused by an object moving past a stationary imaging device, by an imaging device moving past a stationary object, or by a combination of both. If the image velocity is unknown, then the object recognition process cannot rely on a priori knowledge of position and velocity. For example, when the object motion is caused by a conveyor belt upon which the object is moving or the hand of a person holding the object to be recognized or when an object, whose velocity is impossible to measure, passes in front of the recognizer, its velocity may not be readily determinable. In such instances, object recognition becomes a much more difficult problem.

Furthermore, in some instances the object's velocity may be high enough for the image to move several pixels during the frame time of a standard CCD imager. If this is the case, the image of the object captured on a such an imager retina is corrupted and distorted by motion "smear" in the retinal image plane.

First consider an object moving approximately in the x direction at an unknown velocity. The image of that object is the two-dimensional projection of an object out of a set of objects that we wish to recognize, for example, parts on a conveyor belt or alphanumeric characters, whose y location is within a predetermined range, but its precise location within that range is not known. The task of an apparatus for recognizing moving objects is to assign each object either to one of a number of predetermined classes to which it is the best match, or to declare the object unrecognized if there is not enough of a match with any of the classes.

To perform such a classification by standard methods would require an area imager with a sufficient number of pixels in the x and y directions to respectively cover the maximum width of the object at the required resolution, and the maximum height of the object plus whatever range of uncertainty in the y position is required by the application. Furthermore, the imager would need to be fast enough to scan out the complete image in a time shorter than that required by the image of the object—moving at maximum speed—to travel a fraction of a pixel in either the x or y direction. In imagers operating at slower scanning speeds, the object will appear distorted; the amount of the distortion being proportional to the velocity of the object.

In addition to an imager, two frame buffers to store the image would be required; one being used for the object recognition process while the other is being loaded. If the velocity of the image is sufficiently low, one frame buffer may be enough: the image will be first loaded and then operated upon, and the cycle will repeat.

Finally, a microprocessor and related software are needed to perform the recognition operations on the data stored in the frame buffer.

The above-described method works as long as the number of frames to be processed is less than approximately 50 per second. This limitation imposes severe restrictions on the speed of the image and/or the knowledge of the position of the object.

If the velocity of the object is high, for example, traversing the width of the imager in 10 msec or less, and nothing is known about the y position of the object (other than being within the range of the imager), the demands on the electronics are very large and cannot be accommodated by conventional methods and components. In this case, a higher level of parallelism is required.

It is an object of the present invention to provide a single integrated circuit for recognizing objects in a moving image when neither the object's velocity nor the position are known with sufficient accuracy.

BRIEF DESCRIPTION OF THE INVENTION

According to a first aspect of the present invention, a moving object classifier is integrated onto a single integrated circuit chip. Such an integrated circuit according to the present invention includes a retina comprising a two-dimensional array of photosensors upon which the image of the object of interest is focused. The retinal y dimension is sufficient to assure that the image of an object will completely fall on the retina despite uncertainty in the precise knowledge of the y position of the object, and the retinal x dimension is sufficient to contain the width of a single object. The retina may also include some low-level image preprocessing.

A position classifier receives inputs from all of the retina, after appropriately preprocessing the image, and determines when and where in the retina the image of an object with the same global characteristics of the objects of interest is located.

An object classifier receives inputs from the portion of interest of the retina at the time and place as determined by the position classifier, and after appropriate preprocessing, computes the degree of membership of the image to each class to be classified. The classifier determines also which class has the largest membership function (it computes the "max" function).

The outputs of the object classifier are two related binary numbers, the first representing the label of the class (for example, the ASCII code of a particular alphanumeric character, if the objects are characters) and the second representing the confidence that the object belongs to that class.

A scan controller is controlled by the output of the position classifier. Its function is to send to the object classifier that portion of the retinal image which has been identified by the position classifier as containing the object, as soon as such identification has occurred.

All of the above elements of the integrated circuit chip can be interfaced with a microcontroller via an interface controller and behave, from the viewpoint of the microcontroller, like an intelligent peripheral controller. The interface controller communicates to all the internal functional blocks and permits the microcontroller to set-up, monitor and control all of the critical functions of the chip.

A microcontroller comprises a standard CPU, memory and input/output lines interfacing to the interface controller inside the chip. The microcontroller may interrogate the status of or write commands to the other elements in the circuit. The microcontroller may be a separate chip, or may be integrated onto the same chip as the rest of the circuitry.

DETAILED DESCRIPTION OF A PREFERRED EMBODIMENT

Those of ordinary skill in the art will realize that the following description of the present invention is illustrative only and is not intended to be in any way limiting. Other embodiments of the invention will readily suggest themselves to such skilled persons.

The circuits described herein may be fabricated using presently-available CMOS semiconductor processing techniques. Such techniques are well understood by those of ordinary skill in the art. In addition, exact circuit schematic details of numerous circuits which can serve as the functional elements and sub-elements of the integrated moving object recognition system of the present invention as disclosed herein will readily suggest themselves to those of ordinary skill in the art. Such details are beyond the scope of the present invention and will not be included herein in order to avoid needlessly overcomplicating the disclosure and thus obscuring the invention.

According to a presently preferred embodiment of the invention, a great improvement in performance (object speed and recognition accuracy), size, power dissipation, and cost can be achieved by integrating the sensory, object-finding, object-classification and control functions of a moving-object classifier onto a single silicon chip. Such integration allows the functions of the various subparts of the object-recognition system to interact efficiently with the speed necessary to perform their required functions.

Figure 1:
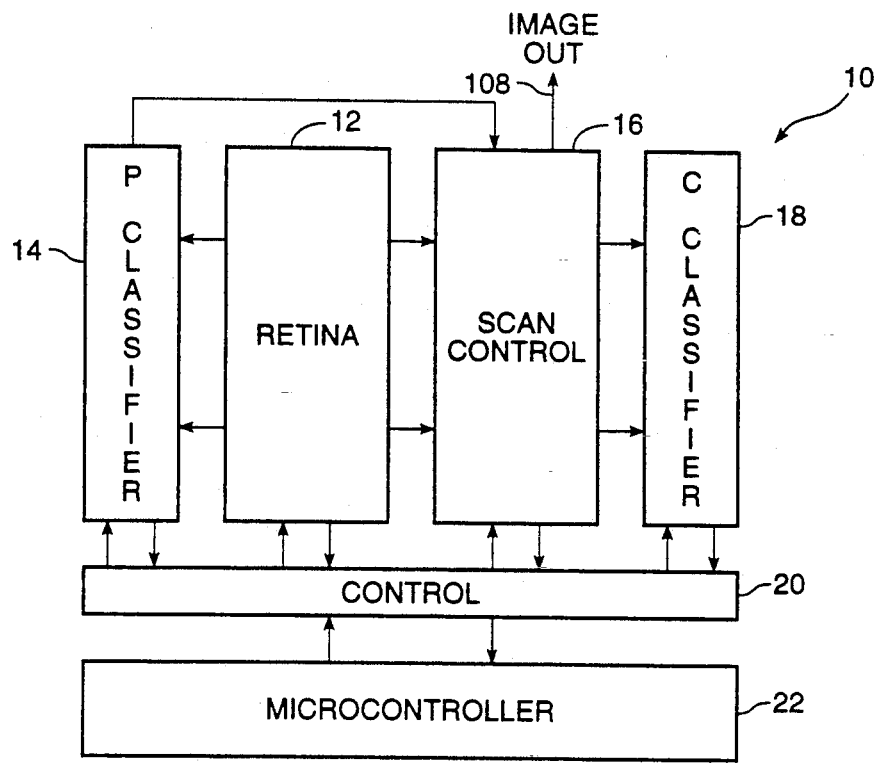
FIG. 1 is a block diagram of a moving object classifier according to a presently preferred embodiment of the invention.

Referring first to FIG. 1, a block diagram of an integrated moving object classifier according to the present invention is shown. Integrated moving object classifier 10 includes a retina 12, which is used to capture an image of the object to be classified from a portion of the physical space where objects of interest may be located.

In a presently preferred embodiment, retina 12 comprises a two-dimensional array of photosensors upon which the image of the object of interest is focused. The function of retina 12 is to capture an image of the object to be classified and convert optical information about the object to electrical information, such as voltages or currents. Retina 12 should be able to adapt to the general level of illumination of the image plane and to report differences from that average at each pixel. Numerous silicon retinas are available for performing this function, for example, as described in the Silicon Retina chapter in the book Analog VLSI and Neural Systems, Carver A. Mead, Addison-Wesley Publishing Co. 1989. This book is expressly incorporated herein by reference in its entirety.

The y dimension of the image plane of retina 12 for use in the present invention should be sufficient to assure that the complete image of an object in its y dimension will fall on the retinal area. The x dimension of retina 12 should be sufficient to contain the width of a single object. To this end, readily-available and appropriate focussing and sizing optics will readily suggest themselves to those of ordinary skill in the art.

Retina 12 may also include some low-level image preprocessing capability, such as orientation, center-surround or velocity-estimation processing. Circuit elements for performing such preprocessing appreciably add to the overhead of retina 12 and are thus preferably used when required for a specific application.

Orientation processing and illustrative apparatus for performing such processing is disclosed in prior application Ser. No. 07,230,459, now abandoned. This application is expressly incorporated herein by reference. Center-surround processing is disclosed in Analog VLSI and Neural Systems and may be implemented as described therein. Object velocity preprocessing may be implemented in retina 12 by equipping it with circuitry such as that described in the Optical Motion Sensor chapter of Analog VLSI and Neural Systems.

In instances where the velocity of the object to be classified is considerable, provision may be made to allow the retina 12 to track the object, thus reducing its relative velocity across the retinal image plane. According to this aspect of the present invention, object velocity computation may take place in retina 12 as previously described. The result of the velocity sensing processing may be utilized by well-understood servo apparatus and techniques to track the object's motion by indexing and/or rotating a moveable table upon which the integrated circuit containing the architecture of the present invention and the optics for focussing the image thereon are situated.

A position classifier 14 receives inputs from all of the retina and, after appropriately preprocessing the image, determines when and where in the retinal image plane the image of an object with the same global characteristics of the objects of interest is located. The position classifier 14 examines data from each pixel of the retinal image plane and determines the time when an object of interest is anywhere in the image plane, and the address of the retinal row where the object begins. This task is accomplished by either edge sensing (evaluating the difference in light intensity between the background illumination and the object) or by comparing the retinal data pattern to one or more learned values. When the confidence of the recognition is above a set threshold, an object of interest is deemed to be present. Techniques for either regimen are known to those of ordinary skill in the art.

The position classifier 14 may also make a determination of the retinal row address where the object ends by using the same procedure used to determine where it begins. By employing position classifier 14, the integrated moving object classifier 10 of the present invention is able to limit or eliminate the processing of irrelevant, non-object-bearing pixel data which takes place during the object classification process, thus increasing throughput and leading to a more efficient, accurate, compact and fast object-recognition device.

Scan controller 16 co-operates with retina 12 and position classifier 14 to scan out the pixels representing the image of the object of interest in the image plane of retina 12. Scanning starts as soon as the position classifier has sufficiently high confidence, and is preferably conducted by transferring an entire row at a time into the hold register (starting at the y location where the object begins, as determined by the position classifier), rather than one pixel at a time as is common practice with TV imagers. Scan controller 16 is controlled by the outputs of the position classifier 14, and as will be disclosed later herein, may also be controlled by a microcontroller to scan out selected portions of the retinal image plane. According to one aspect of the present invention, scan controller 16 is loadable by either the position classifier 14 or a microcontroller with an initial row address and a final row address (or with the number of rows to be scanned) and scans out the portion of the retinal image so defined beginning with the initial row address loaded.

Numerous circuits are known and available to those of ordinary skill in the art for use as scan controller 16. Furthermore, the design of such a initial-and-final-address-loadable scan controller as described herein is well within the level of ordinary skill in the art. Selection of a particular scan-controller circuit 16 will largely depend on the pixel phototransducer circuitry contained in retina 12. For example, if the data for the entire retina 12 is available in parallel, no scanning is required and a barrel shifter, such as the one described in co-pending application Ser. No. 07/549,423, filed Jul. 6, 1990, and expressly incorporated herein by reference, may be used to shift the data so that the range of pixel data containing the object is presented to the classifier. The pixel data starts either at the row specified by position classifier 14, or at another initial position selected by a microcontroller and used to control the barrel shifter.

Object classifier 18 is used to determine whether the captured image is of an object belonging to a class which it has learned. Object classifier 18 receives inputs from the portion of interest of the retina as determined by the scan controller 16 as described above and, after any appropriate preprocessing, computes the degree of membership of the image to each class which it "knows" by virtue of previous learning activity. As presently preferred, object classifier 18 also determines which class has the largest membership function (i.e., it computes the "max" function, identifying the class to which the object has the largest degree of membership).

According to a presently preferred embodiment of the invention, the object classifier 18 also examines the magnitude of the computed membership functions to determine if the degree of class membership is such that sufficient confidence exists that the object is indeed a member of the class. Thus, two signals result from the operation of object classifier 18. The first signal identifies which class of objects the image most resembles. The second signal quantifies the resemblance.

The interface controller 20 is largely a programmable unit providing signal-routing, digital to analog interface, and sequencing logic. It allows the rest of the integrated circuit chip to be interfaced with a microcontroller 22 and to behave, from the viewpoint of the microcontroller 22, like an intelligent peripheral controller. The interface controller 20 enabled communications between all the internal functional blocks of the integrated moving object recognizer and permits the microcontroller 22 to set-up, monitor and control all of the critical functions of the integrated circuit chip. Accordingly, interface controller 20 performs the addressing, data routing, memory storage and retrieval necessary to operate the system.

Microcontroller 22 comprises a standard CPU, memory and input/output lines. Microcontroller 22 interfaces with the interface controller 20. In some cases, such as where there is a need for a large number of high speed control lines connecting between itself and interface controller 20, microcontroller 22 must be integrated onto the chip for performance reasons. The same integration may be required for cost reasons. Otherwise, microcontroller 22 could comprise a separate integrated circuit chip or chips. In some cases it may not even be explicitly required if its functions could be performed by sharing the resources of a microprocessor already existing in the system employing the integrated object classifier 10 of the present invention.

The operation of the integrated object classifier 10 of the present invention may be readily understood as follows. An image of a portion of the physical space where objects of interest may be located is formed in the retina 12. Those of ordinary skill in the art will recognize that objects to be sensed by retina 12 need to be properly illuminated and focused on the image pane of the retina 12.

The complete image may be presented to the holding register of the position classifier 14 one row at a time, and additional image processing may be performed by a one-or-more row-wide array of processors operating on the scanned data such as are disclosed in co-pending application Ser. No. 07/549,423, filed Jul. 6, 1990 and application Ser. No. 07/230,459, filed Aug. 10, 1988, now abandoned both of which are expressly incorporated herein by reference, before the data is loaded into the position classifier 14. Alternatively, the data may be aggregated row-wise and/or column-wise and averaged and scaled down before being fed to position classifier 14. In addition, the data may go through a convolution operation before being fed to the object classifier 18.

In some special cases, it is possible to aggregate the pixel data one or a few rows and columns at a time on separate lines running in the x and y directions across the retina. In this case, the information to be classified by the position classifier 14 is available in parallel and does not need to be scanned out, and no holding register is required.

Figure 2:
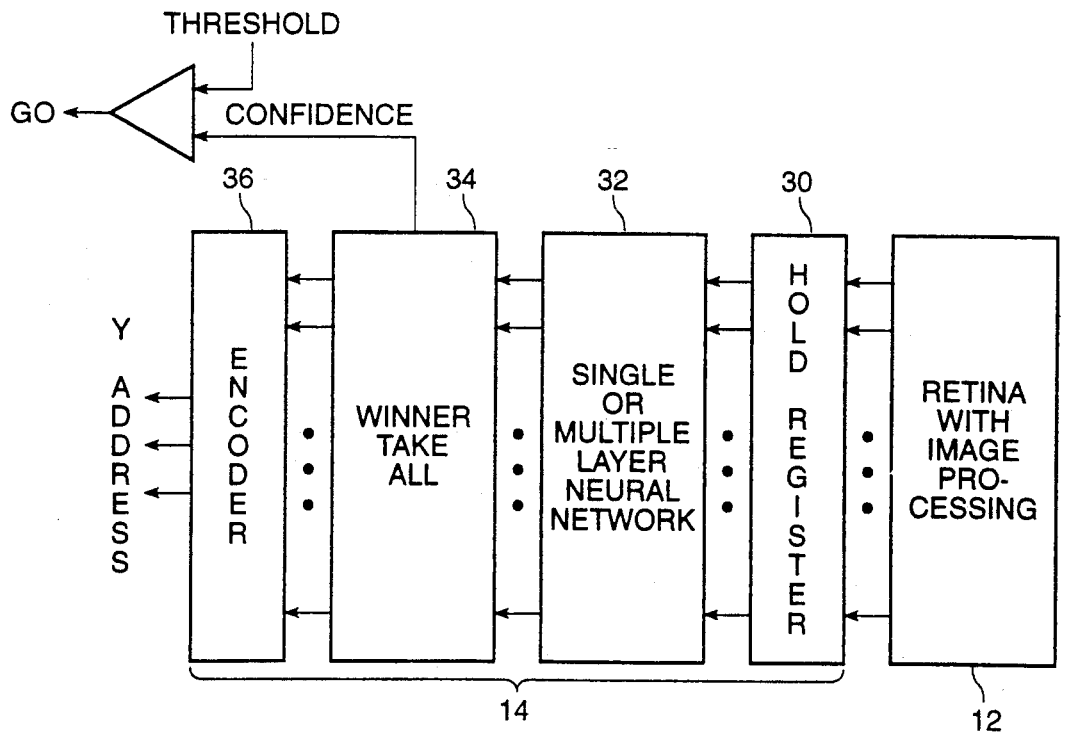
FIG. 2 is a block diagram of the position classifier section of an integrated moving object classifier according to a presently preferred embodiment of the invention.

Referring now to FIG. 2, the structure and operation of the position classifier 14 is disclosed in more detail. In FIG. 2, a block diagram of a position classifier 14 according to a presently preferred embodiment of the invention is shown connected to retina 12. Position classifier 14 may, if necessary, include a holding register 30, which is configured as an analog register. In a presently preferred embodiment, holding register 30 may be an array of sample/hold circuits, as are well known in the art.

Holding register 30 is useful in situations where all data from the retina is not continuously available. Where it is not used, the outputs of the retina to position classifier 14 may be fed directly into the inputs of neural network 32. The outputs of analog holding register 30 drive the position classification electronics In a presently preferred embodiment of the invention where the objects are known a priori to be darker than the background, the output from retina 12 to position classifier 14 is preferably a number of analog values equal to the sum of the number of rows and columns, each analog value representing the sum of all pixel values aggregated on a single wire running along each row and/or each column. The analog voltage or current value represents the lowest light value pixel in that row or column (i.e., the darkest pixel). Those of ordinary skill in the art will understand that other schemes, such as obtaining the max or min function from each row on a single wire, are possible and will be readily able to implement such schemes in the architecture of the present invention.

The classification electronics of position classifier 20 may be implemented as a single or multiple layer neural network 32. Neural network 32 finds the degree of matching between the image being fed to its input and each output representing valid objects at a specific portion of the retinal plane. Neural network 32 comprises a number of analog parameters or weights which are either electrically programmable or fixed at the time of manufacture.

Circuits which compare an input data pattern to a previously-learned pattern and which are thus useful as neural networks are known in the art. Some ones of such circuits which include the capability to readily change learned patterns are also known.

Exemplary circuit structures useful for this element of the present invention include those disclosed in U.S. Pat. No. 5,083,044, and U.S. Pat. No. 4,962,342, both expressly incorporated herein by reference, which can "learn" by applying the pixel pattern to be learned to the synapse circuit element inputs and the storing the pattern, either as charge switched onto a capacitor or charge adjusted on a floating gate in the presence of a source of ultraviolet light. There are other circuit structures which can readily "learn" or change previously learned patterns by application of appropriate electrical control voltages while the pixel pattern to be learned is applied to the synapse circuit element inputs. Examples of such circuits are disclosed in U.S. Pat. Nos. 4,773,024 and 4,802,103 4,953,928, expressly incorporated herein by reference.

Such circuit structures are preferred for use as the neural network 32 in position classifier 14. More complex architectures and learning algorithms using similar hardware elements have been described in Platt, A Resource Allocating Network for Function Interpolation, Neural Computation, Vol. 3, No. 2 (1991), expressly incorporated herein by reference.

The outputs of neural network 32 are operated on by a winner-take-all (max finder) function implemented by winner-take-all circuit 34. Winner-take-all circuit 34 may be a circuit such as the circuits disclosed in U.S. Pat. No. 5,059,814, U.S. Pat. No. 5,049,758, and U.S. Pat. No. 5,146,106 all of which are expressly incorporated herein by reference. The function of winner-take-all circuit 34 is to identify the output with the input image of the neural network 32 which represents the best fit.

The output of winner-take-all circuit 34 is a one-of-n signal, which represents the location of the object in the retina and is converted to the digital row address of the starting portion of the object in the retina. This conversion takes place in encoder 36, which maps each winner to the y-position in the retina occupied by the beginning (bottom) of the object. This address is provided to the scan controller 16 and sets the beginning of the portion of the image to be loaded into the object classifier 18 for recognition.

The winner-take-all circuit 34 also provides a signal representing the confidence that an appropriate object is inside the field of view of the retina. When this confidence signal exceeds a presettable threshold, then a GO signal is generated and the y-position of the object can be loaded into the scan control circuit block 16, and the object classifier can proceed with a determination of the object class.

When position classifier 14 determines there is an object and where the object begins, it sends the row address of the beginning of the image to scan controller 16. Scan controller 16 responds by using that address as a start address for row-by-row loading the image data into object classifier 18. By loading only the pixel data from retinal rows determined to contain object information, object classifier 18 will operate more efficiently by avoiding useless processing operations on pixel data determined not to contain any portion of an object image.

Figure 3:
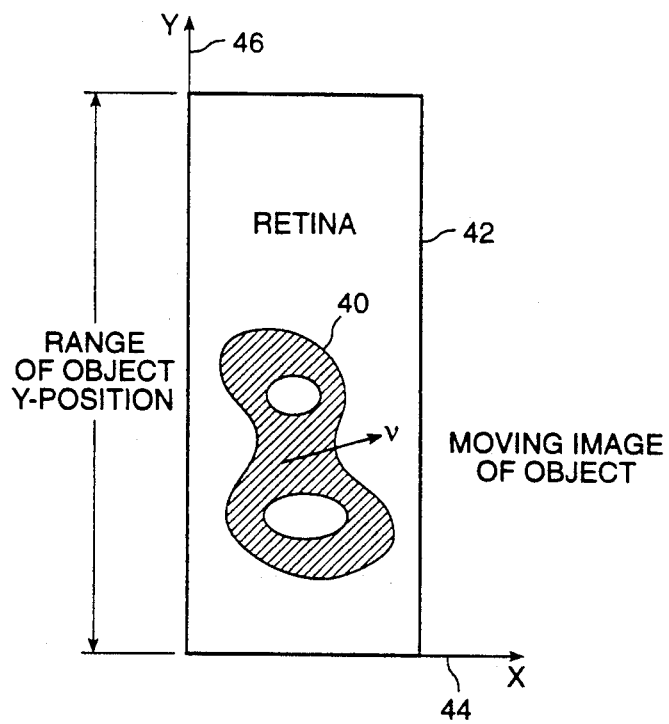
FIG. 3 is a representation of an object to be classified according to the present invention.

FIG. 3 is a representation of an object including a superimposed rectangular co-ordinate system to illustrate certain features of the present invention. Object 40 (shown as the number "8") is bounded by area 42, a rectangle having as two of its sides the x-axis 44 and y-axis 46 of the co-ordinate system. Area 42 represents the retinal image plane area of retina 12 of the integrated object classifier 10 of the present invention. As previously stated, the focussing optics of the system must be designed so as to place within the retinal image plane area 42 the entirety of each object which the system is to recognize.

Figure 4:
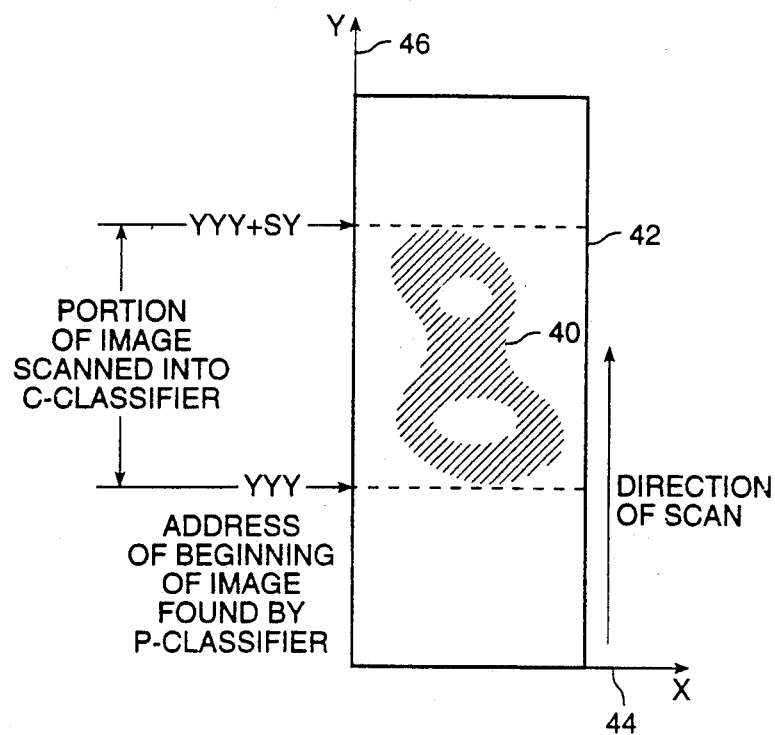
FIG. 4 is a representation of an image of the object of FIG. 3 in motion, to illustrate certain aspects of the operation of the position classifier according to a presently preferred embodiment of the invention.

Referring now to FIG. 4, a representation of object 40, including an indication of some positional uncertainty due to the object's motion indicated by the "fuzzy" representation of the object 40, is shown within the boundaries of retinal image plane area 42. The bottom of the object 40 is located at position yyy on y-axis 46, which represents its y-address row location in retina 12. The top of the object 40 is located at the row having y-address yyy+Sy, where S is the height of the object expressed in pixel row units.

Figure 5:
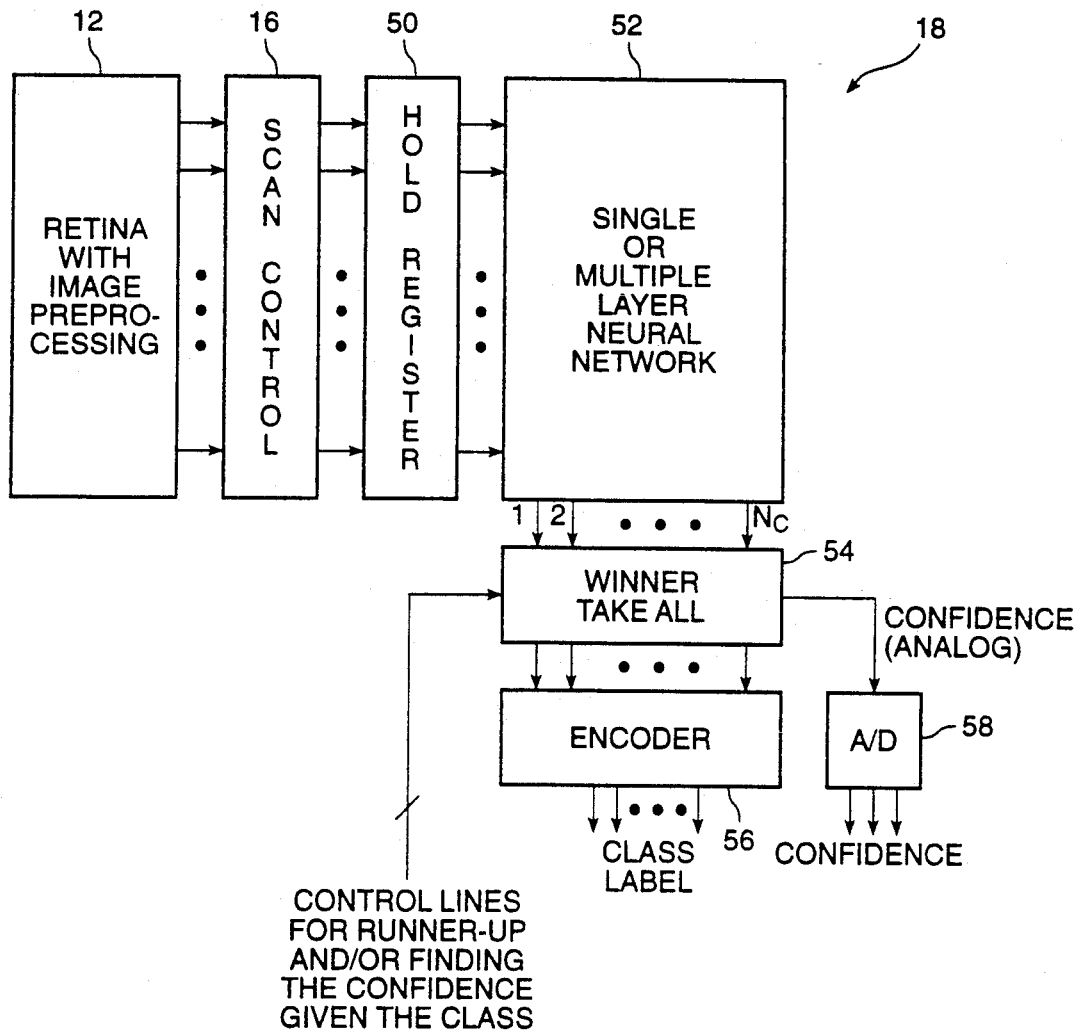
FIG. 5 is a block diagram of the object classifier section of an integrated moving object classifier according to a presently preferred embodiment of the invention.

Referring now to FIG. 5, a block diagram of the object classifier 18 of the present invention shows this portion of the circuit in greater detail. Object classifier 18 includes holding register 50, into which the image pixel data is loaded, usually one entire row at a time. Holding register 50 is an analog register and may comprise an array of sample/hold circuits as is well known in the art. In a presently preferred embodiment, only the portion of the image plane of retina 12 bounded by rows yyy and yyy+Sy, determined by position classifier 14 to contain the image of the object of interest, is loaded into holding register 50. The loading takes place after a GO signal is received from the position classifier 14 and after any preprocessing accomplished in the retina 12, and is accomplished by scan controller 16, which, as previously described, is provided with a row-start address yyy by position classifier 14, and the final address (yyy+Sy) is either wired in, provided by the position classifier 14, or presented by a microcontroller.

The outputs of the holding register drive neural network 52 having Nc outputs, where Nc is the number of separate classes into which objects need to be classified. Neural network 52 may be a single layer or multiple layer neural network as is known in the art. Like neural network 32, neural network 32 comprises a number of analog parameters or weights which are either electrically programmable or fixed at the time of manufacture.

The exemplary circuit structures disclosed with respect to neural network 32 in position classifier 14 are also useful for this element of the present invention. These structures include those disclosed in U.S. Pat. No. 5,083,044, and U.S. Pat. No. 4,962,342, both expressly incorporated herein by reference, which can "learn" by applying the pixel pattern to be learned to the synapse circuit element inputs and the storing the pattern, either as charge switched onto a capacitor or charge adjusted on a floating gate in the presence of a source of ultraviolet light. There are other circuit structures which can readily "learn" or change previously learned patterns by application of appropriate electrical control voltages while the pixel pattern to be learned is applied to the synapse circuit element inputs. Examples of such circuits are disclosed in U.S. Pat. Nos. 4,773,024 and 4,802,103 4,953,928, expressly incorporated herein by reference.

Such circuit structures are preferred for use as the neural networks 32 and 52 in object classifier 18. More complex architectures and learning algorithms using similar hardware elements have been described in Platt, A Resource Allocating Network for Function Interpolation, Neural Computation, Vol. 3, No. 2 (1991), expressly incorporated herein by reference.

The output of the neural network 52 drives winner-take-all circuit 54. Winner-take-all circuit 54 may be one of the circuits previously mentioned herein in the discussion of winner-take-all circuit 34.

Winner-take all circuit 54 in turn drives an encoder 56 which assigns the appropriate class label to the winner. Encoder circuit 56 converts the one-of-n output signal from winner-take-all circuit 54 into a digital value representing the winning class. An example of such a digital value is the ASCII code for a recognized alphanumeric character. Encoders which perform this function are well known in the art.

Winner-take-all circuit 54 also provides an analog output value proportional to the confidence that the object belongs to the class indicated by the winner. This value may be digitized in analog-to-digital converter circuit 58, and the resulting digital value is compared with a predetermined (programmable by microcontroller 22) threshold value. If the confidence value of the winner is above this threshold, the object is deemed to be a member of the winning class. If the confidence value is too low, the object is deemed unrecognizable.

If the portion of the object as found by the position classifier 14 is uncertain over a few pixels in the x and the y direction, then the scan controller 16 can load into the hold register 50 several images shifted in the y direction by the amount equal to the uncertainty. For example, if the x position is known within 3 pixels and the y position is known within ±2 pixels, the position classifier 14 will produce yyy row address when the object is within 3 pixels of the ideal x position and scan controller 16 will load images into the hold register 50 starting at rows yyy-2, yyy-1, yyy, yyy+1, yyy+2 in sequence, and for as long as the confidence level in position classifier 14 is above threshold (objects within 3 pixels in the ideal x position of the object, in this example).

The scanning speed and the object classifier speed need to be fast enough to scan and to classify 5 images over the time it takes the object to move less than one pixel in the x direction.

Figure 6:
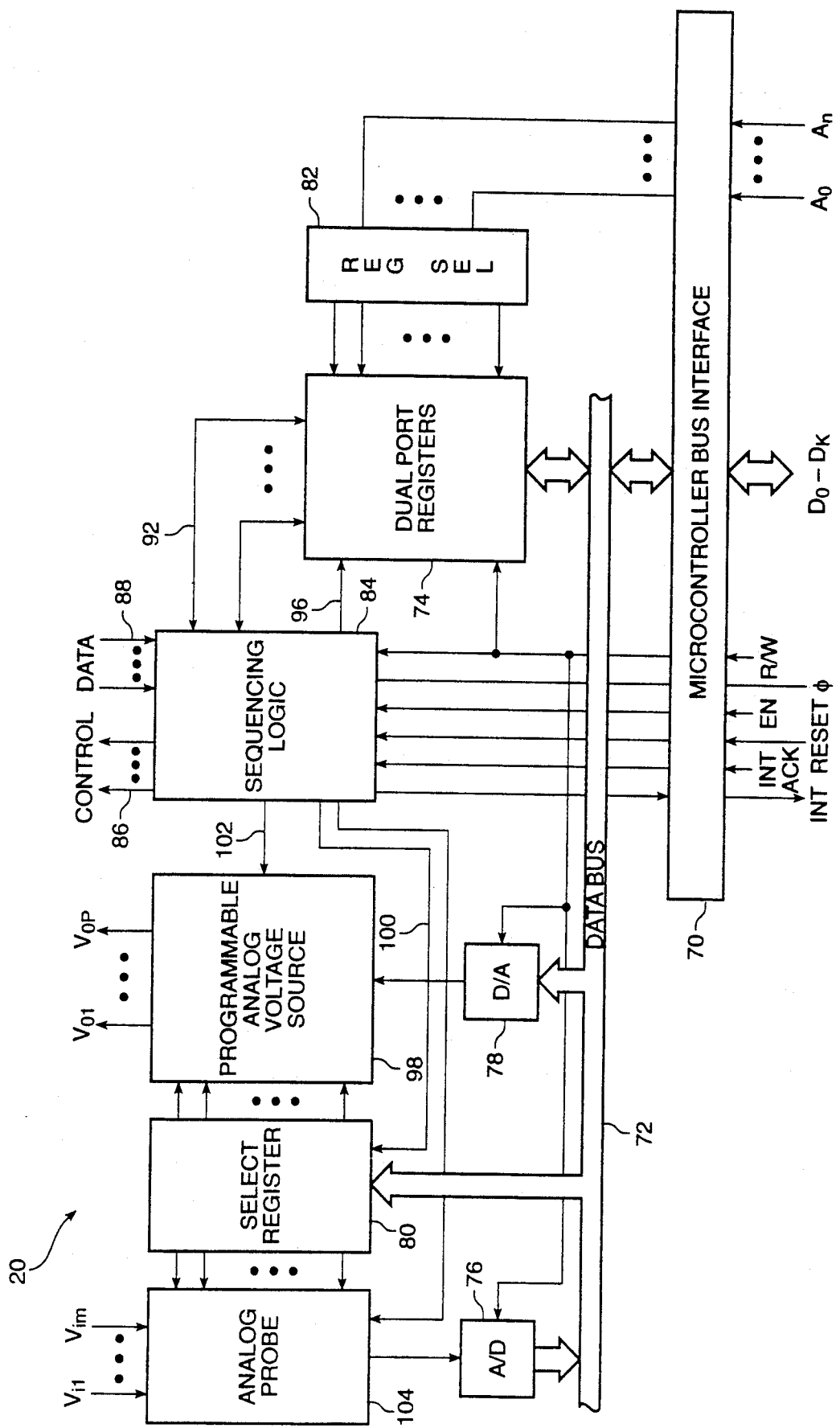
FIG. 6 is a block diagram of the interface controller section of an integrated moving object classifier according to a presently preferred embodiment of the invention.

The functions of interface controller 20 may more easily be understood with reference to FIG. 6, a block diagram of an illustrative interface controller 20 configured according to a presently preferred embodiment of the invention. Interface controller 20 performs several functions. Its exact circuit structure in any given embodiment of the present invention will depend to some extent on the structures of retina 12, position classifier 14, scan controller 16, object classifier 18, and the type of microcontroller 22 employed in the architecture, but the block diagram of FIG. 6 is sufficiently generalized to allow those of ordinary skill in the art to comprehend its functions, and its major elements and their interactions with each other and the other components of the system.

A major function performed by interface controller 20 is to provide a standard interface to microcontroller 22. Once a particular CPU is chosen for use in microcontroller 22, the standard interface to use becomes well defined. As shown in FIG. 6, interface controller 20 includes microcontroller bus interface 70 which provides the \interfacing functions between the present invention and a microcontroller. Standard microcontroller I/O functions including interrupt request and acknowledge lines (INT and INT ACK), read/write line (R/W), device enable line (EN), data I/O lines ($D_0$ through $D_k$), address lines ($A_0$ through $A_n$), system reset (RESET), and clock ($\phi$) are provided to microcontroller bus interface 70 to interface with the various components of the interface controller 20. Microcontroller bus interface 70 communicates with interface controller data bus 72, which communicates with dual-port registers 74, A/D converter 76, D/A converter 78, and select register 80.

Dual port registers 74 are known in the art and may be addressed by microcontroller 22 in a known manner as if they were memory locations on the microcontroller bus and are used to move data in and out of the system. Register selector 82 decodes a portion of the address field asserted on address lines $A_0$ through $A_n$ to select a particular dual-port register. The rest of the address lines may be decoded by conventional means to provide a chip-select function, as is well understood by those of ordinary skill in the art, as well as other functions, if necessary.

Dual port registers communicate with sequencing logic 84 to assert control lines 86 to various elements in the system as required and/or to capture digital data from various points in the system on data lines 88. Non-exhaustive examples of control information asserted by lines 86 include class label to the object classifier for determining the confidence for that class, override control for winner-take-all circuit 54 in object classifier 18 to allow runner-up data, rather than winner data, to be evaluated, and yyy address override from microcontroller 22. Non-exhaustive examples of data taken from lines 88 by sequencing logic 84 include yyy address information from position classifier 14, class label information from encoder 56 in object classifier 18, and confidence level information from A/D converter 58 in object classifier 18.

Those of ordinary skill in the art recognize that the exact configuration of microcontroller bus interface 70, and sequencing logic 84 depend on the particular architectural and circuit environment of any given system, which, once defined, renders detailed circuit design of these elements a routine and simple task.

An important example of the ability to write and read analog values to and from the system is illustrated by programmable analog voltage source 98 which is shown connected to select register 80 and D/A converter 78. Programmable analog voltage source 98 is a functional element which is able to simultaneously generate a plurality of stored analog voltage references shown as $V_{O1}$ through $V_{Op}$ in FIG. 6. In a presently preferred embodiment, programmable analog voltage source 98 may be a circuit such as the one disclosed in co-pending application Ser. No. 07/697,410, filed May 9, 1991, expressly incorporated by reference herein.

Select register 80 acts as an address register to select one or more of the programmable voltage references in programmable analog voltage source 98 in response to the data word on data bus 72 and strobe line 100 from sequencing logic 84. The voltage values of these programmable voltage references can be selectively and dynamically altered by programmable analog voltage source 98 under the control of microcontroller 22, through an address supplied via select register 80 and a control signal supplied by sequencing logic 84 via control line 10 without the need to bring down the system.

The analog voltages supplied by programmable analog voltage source 98 may be utilized in the present invention to bias analog amplifiers, provide reference voltages, and set operating points in various analog circuits, as is well known in the art.

The analog output of D/A converter 78 is connected to programmable analog voltage source. This arrangement allows analog voltage levels written to the interface controller 20 as digital words by microcontroller 22 to set the voltages of the programmable voltage sources.

An analog probe 104, having address inputs connected to select register 98, and one or more control lines 106 from sequencing logic 84, allows selected analog voltages to which its analog data inputs are connected, shown as $V_{I1}$ through $V_{Im}$, to be interrogated by microcontroller 22 through A/D converter 76 connected to its digital output. Analog probe 104 may be thought of as an m-input analog multiplexer having its address inputs driven by select register 80. Non-exhaustive examples of analog voltages which it is desireable to have the ability to interrogate are the outputs $V_{O1}$ through $V_{Op}$ of programmable analog voltage source 98, the contents of hold registers 30 and 50, the outputs of neural networks 30 and 50 in position classifier 14 and object classifier 18, the pixel value of the retina, and analog weight of the classifier, and the analog confidence value output from winner-take-all circuit 54 in object classifier 18.

Because of the control functions provided by interface controller 20, these and other voltages may be interrogated and altered. For example, the retina outputs may be interrogated, and weighting information in the position classifier 14 and object classifier 18 may be interrogated and/or altered, and/or programmed.

Those of ordinary skill in the art will recognize that, if microcontroller 22 is equipped with A/D and D/A capabilities, the analog connections from analog probe 104 and to programmable analog voltage source 98 can be brought directly to the analog I/O pin supplied on the microcontroller and A/D converter 76 and D/A converter 78 may be eliminated.

Each functional block in the system may thus communicate with microcontroller 22 through interface controller 20. In this fashion, microcontroller 22 has access to and can modify the status of key parameters and operating modes in each functional block. For example, in normal operation, the starting y-address of the image to be scanned into the object classifier 18 is provided by the position classifier 14. However, the microcontroller 22 can override this information and cause the starting address to be a value determined by the program it is running. In other instances, for example, the microcontroller 22 can override the choice made by winner-take-all circuit 52 in object classifier 18 and ask for the confidence level value from analog-to-digital converter 58 of an other class, including the identification of the runner up classes in decreasing confidence order. All this possibility of intervention allows for the testing of multiple hypotheses, resulting in improved recognition accuracy.

The neural networks in the position and object classifiers 14 and 18 store a number of parameters (weights) representing attributes of the objects to be recognized. These parameters need to be learned with the help of microcontroller 22 or a computer system outside of the object recognizer. To this end, the scan controller 16 is capable of sending the preprocessed retina image outside of the chip so that the information can be properly captured by external electronics and used to drive the learning algorithms necessary to determine the values of the neural network parameters.

As disclosed above, the parameters of both the position classifier 14 and the object classifier 18 (as well as the winner-take-all circuits 34 and 54 and analog-voltage-generating circuits in programmable analog voltage source 98) in the more general implementation are preferably realized with analog floating gate structures, such as those described in U.S. Pat. No. 4,953,928 and in co-pending application, Ser. Nos. 07/357,520, filed May 25, 1989 and 07/535,283, filed Jun. 6, 1990, and are preferably electrically programmable as disclosed in U.S. Pat. No. 4,953,928. By utilizing such electrically programmable floating gate structures, the same integrated circuit chip may be used for a variety of object recognition tasks.

If cost is an important consideration, it is possible to provide an embodiment of the present invention in which the network parameters are cast into the geometry of the devices used in the classifier, as disclosed, for example, in U.S. Pat. No. 4,773,024. In this case, the recognizer may be provided with a permanent, pre-pre-programmed set of weights that cannot be changed after device fabrication.

The architectural organization of the integrated object classifier of the present invention enables the position classifier 14 and the object classifier 18 to operate concurrently. In contrast, conventional CCD imagers scan the image one pixel at a time, resulting in a slower transfer rate. The transfer rate of the CCD imager is so slow that such imagers are incapable of performing the functions performed by the integrated object classifier of the present invention, at least where the velocity of the object is considerable.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An architecture for a single-chip object classifier comprising:

a retina having an image plane upon which an image of an object to be classified is focussed, said retina organized as an array of rows and columns of pixels, each pixel containing a photosensor, outputs from said retina comprising a plurality of analog electrical signals derived from said photosensors providing a representation of said image;

position-recognizing means for identifying the portion of said image plane containing said image of said object on said retina;

object-recognizing means, responsive to said position-recognizing means, for examining a portion of output from said retina corresponding to the portion of said image plane containing said image and determining the similarity of said object to a plurality of learned classes of objects.

2. The architecture for a single-chip object classifier of claim 1, further including confidence-level generating means in said object-recognizing means, for generating a signal proportional to the degree of similarity between said object and at least one of said learned classes of objects.

3. The architecture for a single-chip object classifier of claim 1, wherein output signals from said retina are supplied to said object-recognizing means one row at a time and said position-recognizing means supplies to said object-recognizing means the row address of said pixels from said retina containing the beginning of said image.

4. The architecture for a single-chip object classifier of claim 1, further including means for interfacing to a general purpose microcontroller, such that said position-recognizing means and said object-recognizing means may be interrogated and controlled by said microcontroller.

5. The architecture for a single-chip object classifier of claim 4, further including means for generating analog voltages from the output of said microcontroller and for sending analog voltages representing selected portions of said image to said object-recognizing means.

6. The architecture for a single-chip object classifier of claim 1, further including means for performing selected image processing directly on the image plane of said retina to adapt the retinal image to a variety of illumination conditions.

7. The architecture for a single-chip object classifier of claim 1, further including velocity-determining means for performing selected image processing directly on the image plane of said retina to determine the velocity of motion of said object.

8. The architecture for a single-chip object classifier of claim 7, further including image-plane moving means, responsive to said velocity-determining means, for tracking moving objects to be classified.

9. The architecture for a single-chip object classifier of claim 4, wherein indicia in said position-recognizing means and said object-recognizing means which relate to classification of objects are readable and writable by said microcontroller.

10. An architecture for a single-chip object classifier comprising:

a retina having an image plane upon which an image of an object to be classified is focussed, said retina organized as an array of rows and columns of pixels, each of said rows identifiable by a row address, each pixel containing a photosensor, outputs from said retina comprising a plurality of analog electrical signals derived from said photosensors providing a representation of said image;

position-recognizing means for determining the row address range of said image of said object on said retina;

temporary image-storage means, responsive to said position-recognizing means, for storing the data from the ones of said pixel photosensors within said row address range of said image;

object-recognizing means, for examining the data in said temporary image storing means to determine the similarity of said object to a plurality of stored classes of objects.

11. The architecture for a single-chip object classifier of claim 10, further including means for dynamically altering said stored classes of objects.

12. The architecture for a single-chip object classifier of claim 10, further including means for interfacing to a general purpose microcontroller, such that said position-recognizing means and said object-recognizing means may be interrogated and controlled by said microcontroller.

13. The architecture for a single-chip object classifier of claim 12, further including means for generating analog voltages from the output of said microcontroller and for sending analog voltages representing a selected portion of said image to said object-recognizing means.

14. The architecture for a single-chip object classifier of claim 10, further including means for performing selected image processing directly on the image plane of said retina to adapt the retinal image to a variety of illumination conditions.

15. The architecture for a single-chip object classifier of claim 10, further including velocity-determining means for performing selected image processing directly on the image plane of said retina to determine the velocity of motion of said image.

16. The architecture for a single-chip object classifier of claim 15, further including image-plane moving means, responsive to said velocity-determining means, for tracking moving objects to be classified.

17. The architecture for a single-chip object classifier of claim 12, wherein weight patterns in said position-recognizing means and said object-recognizing means which define classes of objects are readable and writable by said microcontroller.

18. An architecture for a single-chip object classifier comprising:

a retina having an image plane upon which an image of an object to be classified is focussed, said retina organized as an array of rows and columns of pixels, each of said rows identifiable by a row address, each pixel containing a photosensor, outputs from said retina comprising a plurality of analog electrical signals derived from said photosensors providing a representation of said image;

position-recognizing means for determining the row address range of said image of said object on said retina;

temporary image-storage means, responsive to said position-recognizing means, for storing the data from the ones of said pixel photosensors within said row address range of said image;

data transfer means for transferring said data into said temporary storage means one row at a time;

object-recognizing means, for examining the data in said temporary image storing means to determine the similarity of said object to a plurality of stored classes of objects.

19. The architecture for a single-chip object classifier of claim 18, further including means for dynamically altering said stored classes of objects.

20. The architecture for a single-chip object classifier of claim 18, further including means for interfacing to a general purpose microcontroller, such that said position-recognizing means and said object-recognizing means may be interrogated and controlled by said microcontroller.

21. The architecture for a single-chip object classifier of claim 20, further including means for generating analog voltages from the output of said microcontroller and for sending analog voltages representing a selected portion of said image to said object-recognizing means.

22. The architecture for a single-chip object classifier of claim 18, further including means for performing selected image processing directly on the image plane of said retina to adapt the retinal image to a variety of illumination conditions.

23. The architecture for a single-chip object classifier of claim 18, further including velocity-determining means for performing selected image processing directly on the image plane of said retina to determine the velocity of motion of said image.

24. The architecture for a single-chip object classifier of claim 23, further including image-plane moving means, responsive to said velocity-determining means, for tracking moving objects to be classified.

25. The architecture for a single-chip object classifier of claim 20, wherein weight patterns in said position-recognizing means and said object-recognizing means which define classes of objects are readable and writable by said microcontroller.

26. The architecture for a single-chip object classifier of claim 18, wherein said object recognizing means aggregates said analog electrical signals from each row in said retina along a single wire associated therewith.

27. The architecture for a single-chip object classifier of claim 18, wherein said object recognizing means aggregates said analog electrical signals from each column in said retina along a single wire associated therewith.

* * * * *